United States Patent Office 3,145,969
Patented Aug. 25, 1964

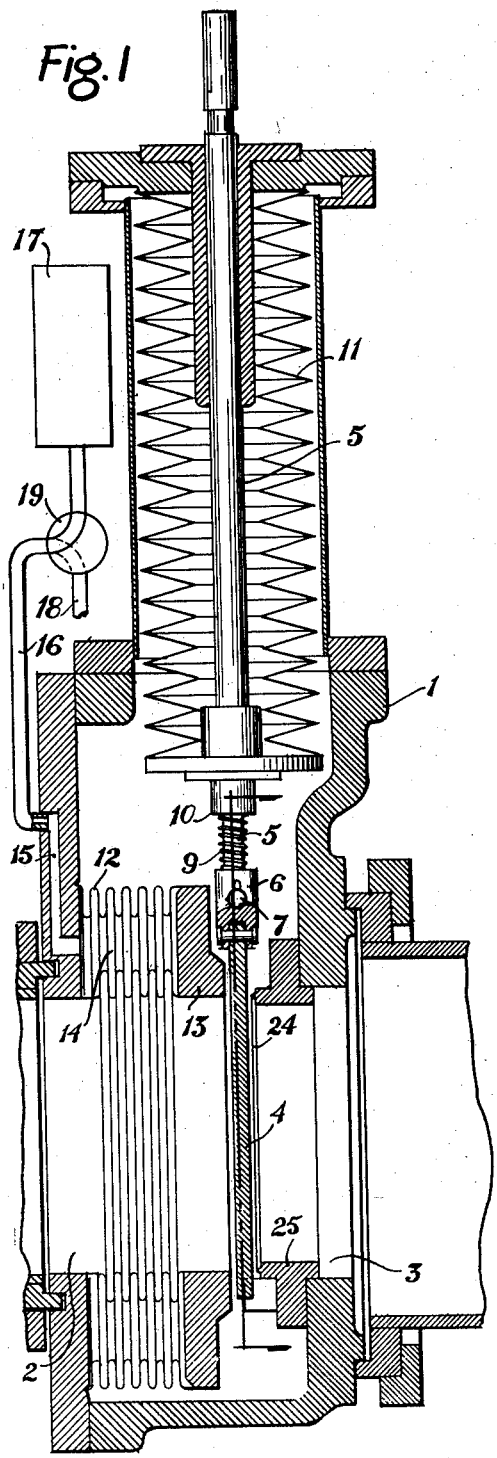

3,145,969
GATE VALVE HAVING FLUID PRESSURE SEAL
AND LIMIT STOP MEANS
Tiemo von Zweck, Burlington, Mass., assignor to High
Voltage Engineering Corporation, Burlington, Mass.,
a corporation of Massachusetts
Filed July 3, 1961, Ser. No. 121,635
4 Claims. (Cl. 251—172)

This invention relates to high vacuum equipment and in particular to a gate valve for use with such high vacuum equipment. The gate valve of the invention will be found to be particularly useful in connection with the vacuum systems of charged particle accelerators, isotope separators, and the like.

Charged particles must be accelerated in a highly evacuated region, since the presence of gases at ordinary pressures would place so many gas molecules in the paths of the charged particles that the resultant frequent collisions between charged particles and gas molecules would prevent any appreciable number of charged particles from attaining the desired kinetic energy. The necessary degree of vacuum is given approximately by the requirement that the mean free path of the charged particles in the evacuated region be greater than the length of the path traveled by the charged particles therein. Thus, for example, in a standard 2 mev. electron accelerator manufactured by High Voltage Engineering Corporation, the assignee of the present application, the normal operating pressure in the evacuated region is of the order $10^{-6}$ mm. Hg, and the maximum permissible continuous operating pressure of $30 \times 10^{-6}$ mm. Hg.

While the acceleration tube itself may be constructed as a single unit, it is necessary to attach thereto various auxiliary equipment, such as vacuum pumps, meters, and apparatus for making use of the high energy charged particles produced by the particle accelerator. Thus, for example, in the standard 2 mev. electron accelerator referred to above, there are nine devices to be connected in sequence between the end of the acceleration tube proper, and the beam utilization apparatus for making use of the charged particles.

In the event of breakdown in a particular portion of the vacuum system, or in the event that it becomes desired to interchange parts, it is desirable to be able to remove parts of the vacuum system for examination or replacement without destroying the vacuum in the entire vacuum system by the admission of atmospheric air. For this purpose, high vacuum valves must be employed. These high vacuum valves must be able to maintain a vacuum of $10^{-6}$ mm. Hg inside the vacuum system against atmospheric pressure outside the vacuum system, and they must be adapted to frequent opening and closing.

Vacuum valves and plumbing are essentially different from conventional valves and plumbing. In conventional plumbing, the objective is to convey a fluid, either liquid or gas, from one location to another, and any device, such as a gate valve, which is designed to provide a complete seal must be designed to minimize product loss. Some leakage can be tolerated, and the maximum permissible leakage is determined with reference to the total amount of fluid product involved. In vacuum piping, on the other hand, even the slightest leak involves, not merely product loss, but total destruction of the vacuum. The amount of material which may be allowed to enter a vacuum system is so much less than the amount which may be allowed to leave a conventional plumbing system, that the difference is one of kind rather than degree, and vacuum plumbing constitutes an entirely new art. Thus, as stated by Dushman in the standard work entitled "Vacuum Technique" (1949) at pages 127–8:

"As a result there has been developed, since about 1940, a new industry—vacuum technology. The production of vacua of the order of $10^{-3}$ micron and even lower has been transformed from a laboratory curiosity to an industrial operation carried out on a scale that would, at one time, have been considered utterly fantastic. In the near future the vacuum engineer and vacuum technologist will take their place in industrial activities along with the engineers and technologists trained in the older fields."

Moreover, vacuum destroying gases originate not only through leaks in the system, but also from the inner surfaces of the materials of which the system is composed, particularly in vacuum systems in which charged particles are traveling at high energy. For this reason, it is desirable to have an all-metal vacuum system. This means that the organic materials which usually form the compressible sealant in a conventional valve cannot be used in a high vacuum system designed for optimum operation.

All metal vacuum valves of the prior art have customarily used a metal gate which is supported on metal bellows which permit the gas to be moved upon a circular knife edge to close the valve and away therefrom to open the valve. Some prior art embodiments utilize right-angled valves of this type wherein mechanical motion may be transmitted mechanically to the gate through the side of the vacuum chamber. Such right-angled valves, however, are unsuited to certain operations involving the use of charged particles wherein the vacuum system comprises an elongated vacuum chamber having a more or less rectilinear axis in order to accommodate the path of the charged particles. One straight-through gate valve which has been designed for this purpose preserves the technique of the right-angled valve by introducing the mechanical link to the gate through the side of the vacuum chamber at an angle of about 45°, so that the gate and aperture therefor also lie within the vacuum chamber at an angle of about 45° to the axis thereof. However, the difficulties with such a valve include the fact that it occupies an inordinate length of vacuum plumbing and the fact that the size of the aperture, which is elliptical, is much larger than is necessary to transmit a given beam of circular cross section.

In accordance with my invention I provide an all-metal vacuum valve having short length, large aperture, and avoiding the use of organic material. Essentially my invention comprehends a gate which is introduced into the vacuum pipe transversely thereto between a knife edge and an apertured member supported upon a double metal bellows into which fluid material may be introduced to close the valve and from which it may be extracted to open the valve. Such fluid material is preferably gaseous, and the invention is hereinafter described with particular reference to use of a gaseous material, but the invention is not limited thereto and includes the use of liquid material. An important feature of the invention is the provision of indexing means whereby the knife edge s caused to mate with the same groove on the gate at each closing of the valve. In the following detailed description the knife edge is described as being circular, but the invention includes any knife edge defining a closed loop, such as, for example, a rectangular slot-shaped loop.

The invention may best be understood from the following detailed description thereof having reference to the accompanying drawing in which:

FIGURE 1 is a central section through a vacuum pipe and associated gate valve constructed in accordance with the invention; and FIGURE 2 is a view along the line 2—2 of FIG. 1.

Referring to the drawing, the gate valve therein shown includes a housing 1 having appropriate apertures 2, 3 therein which define the passageway which it is the function of the gate valve to close. A copper gate 4 is supported upon a rod 5 by means of a link 6. The link 6 is hollow at its upper end so as slidably to receive the rod 5, and a lug 7 extending transversely from the lower end of the rod 5 passes through an aperture in the side of the link 6. A bar 8 at the lower end of the link 6 engages an aperture in the gate 4. A spring 9 surrounding the rod 5 is held between the link 6 and a shoulder 10 on the rod 5. The rod 5 extends through the housing 1 and is supported on a metal bellows 11 which permits sliding movement to be imparted to the rod 5 while preserving a vacuum seal. When the rod 5 is moved into the housing 1, movement is transferred to the gate 4 via the spring 9; when the rod 5 is moved out of the housing 1 movement is transferred to the gate 4 via the lug 7.

A double metal bellows 12 is mounted inside the housing 1 around the aperture 2, and the other end of the double metal bellows 12 has supported thereon an apertured disk 13. The double walls of the double metal bellows 12 define an annular space 14, one end of which is terminated by the apertured disk 13 and the other end of which communicates with a channel 15 in the housing 1. This channel 15 may be connected via a suitable pipe line 16 either to a gas supply 17 for the introduction of gas under pressure into the annular space 14, or to an outlet pipe 18 for discharge of gas from the annular space 14, by means of a valve 19.

The gate valve is closed by moving the rod 5 so as to expand the metal bellows 11 and push the spring 9 against the gate 4. The bottom of the gate 4 is provided with two notches 20, 21, one of which, as shown at 20 may be triangular in nature and the other of which, as shown at 21, may be relatively flat or trapezoidal. As the gate 4 is pushed by the rod 5 the two notches 20, 21 in the bottom of the gate 4 are pushed against two circular rods 22, 23. The triangular notch 20 prevents not only downward movement of the gate 4 but also lateral movement thereof. The trapezoidal notch 21 permits lateral movement of the gate 4. In effect, then, the combination of notches 20, 21 and rods 22, 23 provides three fixed points along the bottom edge of the gate 4 which are the same for every closing of the gate 4, two of these fixed points being in the triangular notch 20 and the third being in the top of the trapezoidal notch 21. Moreover, with each closing of the valve the pressure of the gate 4 upon the rods 22, 23 is maintained uniform by virtue of the fact that this pressure is provided exclusively by the spring 9 which is the mechanical link through which the pressure on the rod 5 is transmitted to the gate 4 since, as shown in FIG. 1, the spring 9 is only partially compressed when the gate valve is in the closed position. After the gate 4 has been moved to the closed position shown in FIG. 1, gas is introduced into the annular space 14 so that the apertured disk 13 is pushed against the gate 4 until it is stopped by an annular knife edge 24 on a flange 25 supported inside the housing 1 around the aperture 3. To open the gate valve the gas pressure is released in the annular space 14 by means of the valve 19, and the gate 4 is pulled away by means of the rod 5.

The invention is not limited to any particular mechanism for moving the gate 4 (such as the sliding movement of the rod 5), but includes any suitable means for imparting mechanical motion thereto.

Thus in accordance with the invention there is provided an all-metal, bakeable gate valve. The gate valve of the invention is free from organic materials, so that it can be placed in areas where high levels of radiation are present; such radiation would, of course, damage organic materials and cause them to give off gases or vapors. Moreover the gate valve of the invention is thin, so that it adds very little length to the vacuum plumbing into which it is introduced. The gate valve of the invention is particularly well suited to ultra-high vacuum systems, which are defined as inorganic systems operating below $10^{-6}$ mm. Hg and usually bakeable. An important feature of the invention is the annular pressure chamber 14. Another important feature of the invention is the kinematical alignment provided by the notches 20, 21 and the rods 22, 23 which provide three points for kinematical alignment of the knife edge 24 with the circular impression made by said knife edge after the first closing of the valve. Still another important feature of the invention is the use of the spring 9 for providing uniform contact load upon the rods 22, 23.

Having thus described the principles of the invention, together with an illustrative embodiment thereof, it is to be understood that although specific terms are employed, they are used in a generic and descriptive sense, and not for the purposes of limitation, the scope of the invention being set forth in the following claims.

I claim:

1. A high vacuum gate valve for use in a particle accelerator vacuum system comprising in combination a metal housing having two apertured walls, a metal gate, means for advancing said gate into and out of a position intervening between the apertures in said walls, gate-stop means supported so as to abut the advance edge of said gate at three places when said gate is in said intervening position and thereby prevent further advance movement of said gate, two of said places of abutment on said advance edge comprising two lateral surfaces so disposed as to prevent lateral movement of said gate, said third place of abutment being so disposed as to prevent downward movement only of said gate, a knife-edge mounted on one of said walls about the aperture therein, a metal chamber having flexible boundaries mounted on the interior of the other wall so that said chamber lies about the aperture therein, and means for introducing a fluid under pressure into said chamber to effect expansion thereof and cause said gate to be pressed against said knife-edge.

2. A high vacuum valve in accordance with claim 1, wherein said advancing means includes a spring through which the advancing movement is imparted to said gate, and wherein said spring is partially compressed when said gate is in said intervening position.

3. A bakeable high vacuum, gate valve comprising in combination a metal housing having two apertured walls, a gate having at triangular notch and a trapezoidal notch, mutually spaced, in the advance edge thereof, means for advancing said gate into and out of a position intervening between the apertures in said walls, two rods supported between said apertured walls so as to abut said notches, respectively, when said gate is in said intervening position, said triangular notch providing two lateral surfaces so disposed as to prevent lateral movement of the gate and said trapezoidal notch being so disposed as to prevent downward movement only of the gate, and thereby prevent both further advancing movement and lateral movement of said gate, a knife-edge mounted on one of said walls about the aperture therein, a metal chamber having flexible boundaries mounted on the interior of the other wall so that said chamber lies about the aperture therein, and means for introducing a fluid under pressure into said chamber to effect expansion thereof, said gate being pressed against said knife-edge thereby.

4. In a particle accelerator vacuum system, a bakeable, high vacuum, gate valve consisting of a metal housing member, said housing member being through at least one aperture, integrally interconnected with, and in part defining, said vacuum system, said housing member having on the interior surface thereof a knife-edge protrusion peripherally encompassing one vacuum system interconnecting aperture, a metal plate adapted to effect a closure of said aperture, means for positioning said metal plate into and out of closure relationship with said aperture, said last named means including an actuating rod and metal bellows adapted to provide external control of said metal plate, two plate stopping lugs disposed within said housing member and arranged to cooperate with respective notches in the advanced edge of said metal plate and establish the same fixed discrete position upon closure at each operation thereof, said notches including a triangular notch to prevent lateral movement of the plate and a trapezoidal notch to prevent downward movement only of the plate, and means for maintaining spring loading on said plate during closure, a flexible annular metal chamber disposed within said housing member, said chamber being fixedly attached to one wall thereof and in coaxial relationship to said aperture, and means for inflating said chamber, said chamber when in an inflated condition being adapted to press said metal plate against said knife edge protrusion so as to hermetically seal said interconnecting aperture.

References Cited in the file of this patent

UNITED STATES PATENTS

| | | | |
|---|---|---|---|
| 1,970,964 | Hosmer | Aug. 21, | 1934 |
| 2,858,096 | Warren | Oct. 28, | 1958 |
| 2,879,786 | Heideman | Mar. 31, | 1959 |
| 2,906,491 | Young | Sept. 29, | 1959 |
| 2,923,522 | Reppert | Feb. 2, | 1960 |
| 3,036,812 | Wierzbicki | May 29, | 1962 |
| 3,042,359 | Bredtschneider | July 3, | 1962 |
| 3,062,238 | Boyd | Nov. 6, | 1962 |

FOREIGN PATENTS

| | | | |
|---|---|---|---|
| 674,771 | Great Britain | July 2, | 1952 |